United States Patent [19]

Nakamura et al.

[11] 4,370,436

[45] Jan. 25, 1983

[54] PROCESS FOR PREPARING FILLED POLYTETRAFLUOROETHYLENE MOLDING POWDER

[75] Inventors: Yukiharu Nakamura, Ibaraki; Shoji Kawachi, Nishinomiya, both of Japan

[73] Assignee: Daikin Kogyo Co., Ltd., Osaka, Japan

[21] Appl. No.: 281,062

[22] Filed: Jul. 7, 1981

[30] Foreign Application Priority Data

Jul. 8, 1980 [JP] Japan ................... 55-93702

[51] Int. Cl.$^3$ ................... C08K 5/01; C08K 5/02; C08L 27/18; C08L 43/04
[52] U.S. Cl. ................... 524/322; 264/117; 524/506; 524/546; 524/406; 524/439; 528/486; 528/499
[58] Field of Search ............ 260/23 XA, 42.15, 42.27, 260/42.55; 264/117; 528/486, 499; 524/546, 322, 506, 406, 439

[56] References Cited

U.S. PATENT DOCUMENTS

| | | | |
|---|---|---|---|
| 3,202,626 | 8/1965 | Fitzsimmons et al. | 260/42.55 |
| 3,527,857 | 9/1970 | Fitz | 264/117 |
| 3,772,249 | 11/1973 | Morgans | 260/42.55 |
| 3,781,258 | 12/1973 | Kometani et al. | 528/499 |
| 3,882,217 | 5/1975 | Banham et al. | 264/117 |
| 3,915,916 | 10/1975 | Leverett | 260/29.6 F |
| 3,929,721 | 12/1975 | Leverett | 260/29.6 F |
| 3,968,069 | 7/1976 | Grimaud et al. | 524/546 |
| 3,980,596 | 9/1976 | Leverett | 260/23 XA |
| 3,998,770 | 12/1976 | Malhotra | 524/506 |
| 4,163,742 | 8/1979 | Mansure | 260/42.27 |
| 4,241,137 | 12/1980 | Izumo et al. | 528/499 |

Primary Examiner—Ronald W. Griffin
Attorney, Agent, or Firm—Armstrong, Nikaido, Marmelstein & Kubovcik

[57] ABSTRACT

A process for preparing a filled agglomerated polytetrafluoroethylene molding powder having a high flowability by agitating finely-divided polytetrafluoroethylene particles and a filler in an aqueous medium. While agitating a hydrophilic filler treated with an aminosilane compound in water in the presence of a higher fatty acid and/or an anionic surface active agent, the polytetrafluoroethylene particles and a water-immiscible organic liquid are added to water in that order, whereby most of the filler used can be uniformly incorporated into the agglomerated product without causing separation into the aqueous medium.

5 Claims, 3 Drawing Figures

U.S. Patent    Jan. 25, 1983    4,370,436
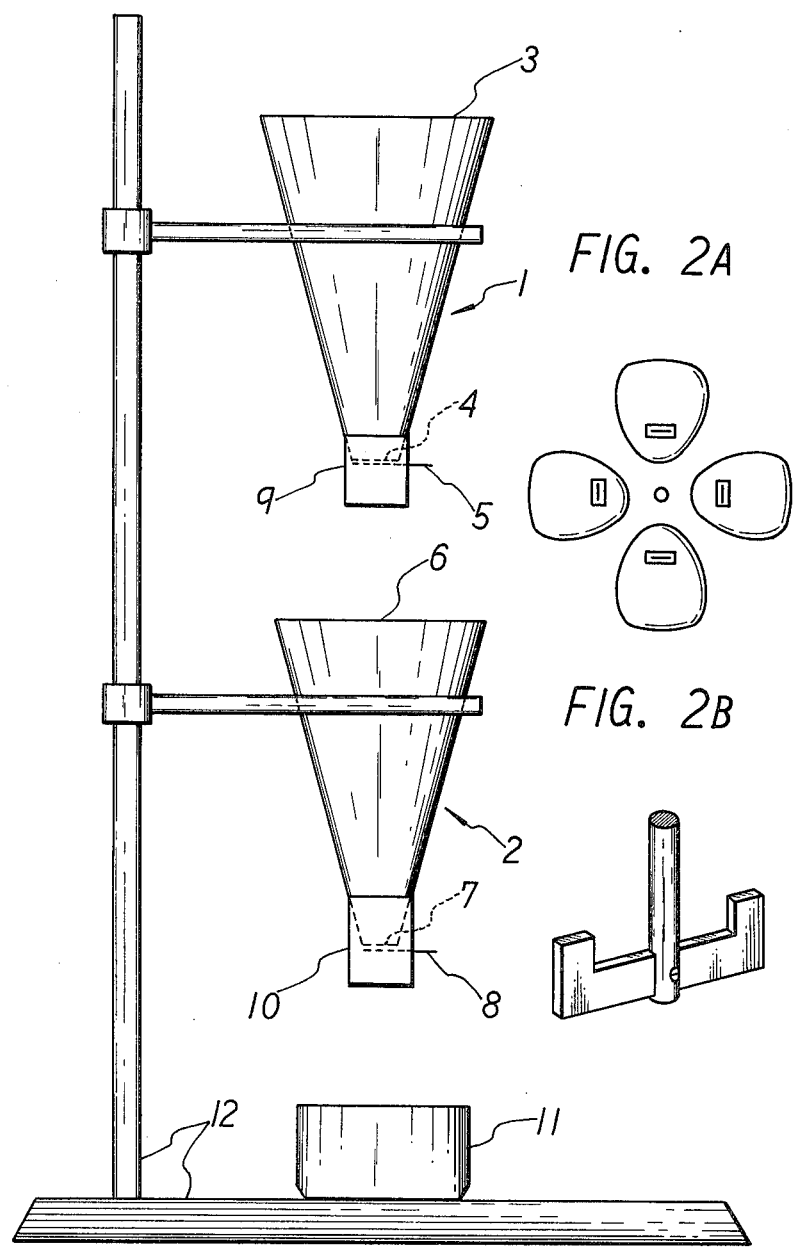

PROCESS FOR PREPARING FILLED POLYTETRAFLUOROETHYLENE MOLDING POWDER

BACKGROUND OF THE INVENTION

The present invention relates to a process for preparing a molding powder of polytetrafluoroethylene (hereinafter referred to as "PTFE"), and more particularly to an improved process for preparing agglomerated PTFE granules containing a filler material.

The PTFE molding powders are obtained by grinding granules made by suspension polymerization into finely-divided particles, and have been fabricated by compression molding or ram extrusion. The particle size of the finely-divided particles ranges from about 5 $\mu$m. minimum to about 1,000 $\mu$m. maximum, but is usually less than about 100 $\mu$m. In order to improve the abrasion resistance and hardness of the molded articles of PTFE, such molding powders are uniformly incorporated with one or more than two kinds of filler materials, e.g. a glass bead, powder or fiber, carbon, graphite, molybdenum disulfide, bronze powder or various heat resisting synthetic resin powders such as polyimide, polyamideimide and polyphenyleneoxide, which are called and employed as filled PTFE molding powder.

With increasing demand for automatic molding in recent years, an agglomerated granular type of filled PTFE molding powder having improved handling characteristics, particularly improved flowability and high apparent density has been prepared and employed.

Processes for agglomeration are mainly classified into a dry process in which water is not employed and a wet process in which water is employed. A typical one of the dry processes is a process described in U.S. Pat. No. 3,781,258 in which an intimate mixture of PTFE and a filler is wetted with an organic liquid capable of wetting the PTFE particles such as carbon tetrachloride, acetone, trichloroethylene or a fluorinated and chlorinated hydrocarbon and is then subjected to the mechanical force such as agitation. In a wet process, a mixture of the PTFE particles, a filler and a water-immiscible organic liquid as used in the above-mentioned dry process is agitated in a considerable amount of water. Such a wet process requires steps for the separation and drying of water after the agitation treatment, but is superior to a dry process in that automatization of the manufacturing process is relatively easy.

However, the wet process has the disadvantage that in case of using a hydrophilic filler such as glass fiber, the filler is easy to migrate to water phase due to good affinity with water and is hard to uniformly admix with the PTFE particles. As a result, all amount of the filler is not incorporated into the agglomerated granules, and a part of it remains in water. This phenomenon is called separation of filler. In order to solve this problem, there are proposed a process in which a filler is previously subjected to surface treatment to lower the surface activity of the filler and make its surface hydrophobic, thus bringing the surface activity close to that of PTFE, and thereafter such a filler is utilized in agglomeration in an aqueous medium; and a process in which such a surface-treated filler is not utilized, but an additive that affords similar function to the filler is added to an aqueous medium upon agitation for agglomeration. Those surface treating agents or additives are (a) silanes having amino functional groups and/or soluble silicones as disclosed in U.S. Pat. No. 3,929,721, (b) $C_{12}$ to $C_{20}$ aliphatic carboxylic acids as disclosed in Examined Japanese Patent Publication No. 37576/1973, (c) chromium complexes of aliphatic carboxylic acids as disclosed in Examined Japanese Patent Publication No. 37576/1973, and (d) silicones as disclosed in Unexamined Japanese Patent Publication No. 139660/1978. It is also known from (e) Unexamined Japanese Patent Publication No. 121417/1976 to coat hydrophilic filler particles with PTFE.

However, these known processes have still problems to be solved. That is to say, it is hard to achieve shortening the steps of the process, since in all these processes a uniform mixture of the PTFE particles and a filler must have been prepared previously and thereafter subjected to agitation for agglomeration. Moreover, some kinds of fillers inevitably accompanies a problem to cause harm to the working environment due to dust formation. Further, the above-mentioned processes (a), (b) and (d) are insufficient in the effect of preventing the separation of filler, and the process (c) causes coloration on the molded articles after sintering. The process (e) is relatively advantageous for preventing the separation of filler, but the flowability of the agglomerated granules is insufficient because PTFE fine powder, i.e. dispersion grade PTFE powder which is obtained by polymerization of tetrafluoroethylene in the presence of a dispersing agent, is used.

It is an object of the present invention to provide a process for preparing a filled PTFE molding powder.

A further object of the invention is to provide an improved process for preparing agglomerated PTFE granules containing a filler in shortened process steps without causing the separation of the filler.

A still further object of the invention is to provide a filled PTFE molding powder having a good flowability and capable of giving sintered moldings having an improved surface smoothness.

These and other objects of the present invention will become apparent from the description hereinafter.

SUMMARY OF THE INVENTION

In accordance with the present invention, there is provided an improvement in a process for preparing a filled polytetrafluoroethylene molding powder by agitating finely-divided polytetrafluoroethylene particles having an average particle size of not more than 100 $\mu$m. and a particulate hydrophilic filler in water in the presence of a water-immiscible organic liquid, the improvement which comprises, while agitating a particulate hydrophilic filler which has been surface-treated with an aminosilane compound in water in the presence of a higher fatty acid having 12 to 18 carbon atoms and/or an anionic surface active agent, adding to the water the finely-divided polytetrafluoroethylene particles and the water-immiscible organic liquid in that order, and atitating the mixture for a time sufficient to agglomerate the particles.

BRIEF DESCRIPTION OF THE DRAWINGS

FIG. 1 is a schematic view showing a device for measuring the flowability of a powder; and FIGS. 2A and 2B are schematic views showing vanes of an agitator used in Examples of the present invention.

DETAILED DESCRIPTION

The process of the present invention has the following features as compared with conventional processes.

(1) It is not necessary to previously conducting uniform admixing of the PTFE particles and a filler, and agglomerated granules in which the filler is uniformly incorporated can be prepared without separation of filler by merely adding the particles and the filler in that order to an agitation vessel.

(2) The process of the invention is applicable to the incorporation of not only a filler such as glass or bronze which is a filler having a particularly strong hydrophilic property, but also a filler such as molybdenum disulfide or graphite powder of which hydrophilic property is not so strong.

(3) Molded articles after sintering have an improved surface smoothness.

(4) The flowability of the agglomerated product is sufficiently high. That is to say, although a filled agglomerated product is in general inferior in flowability to an agglomerated product without filler, the product according to the process of the invention has a flowability close to that of the agglomerated product without filler.

The PTFE used in the present invention includes, for instance, homopolymer of tetrafluoroethylene and copolymers of tetrafluoroethylene and at most 2% by weight of a monomer copolymerizable with tetrafluoroethylene. As a copolymerizable monomer, there are mentioned, for instance, perfluoroalkenes having 3 to 6 carbon atoms such as hexafluoropropylene, and perfluoro(alkyl vinyl ether) having 3 to 8 carbon atoms such as perfluoro(propyl vinyl ether), and the like. The copolymers modified with such copolymerizable monomers is not melt-processable as well as tetrafluoroethylene homopolymer. These polymers are employed in the form of finely-divided particles having an average particle size of not more than 100 μm. As well as the above finely-divided PTFE particles, in the present invention, a small amount of an aqueous dispersion of colloidal PTFE having an average particle size of 0.1 to 0.5 μm. may be used. The use of the colloidal PTFE dispersion is especially benefitable when a large amount of filler is employed, since it promotes the effect of depressing the filler separation. The colloidal PTFE is used, when employed, in an amount of from 1 to 5% by weight based on the weight of the finely-divided PTFE particles. The addition of the dispersion to the system is preferably prior to the addition of a water-immiscible organic liquid to the system.

The fillers used in the present invention are those which can be easily dispersed in water by agitation, and include, for instance, a strong hydrophilic filler such as a glass powder, a glass fiber, a glass micro-balloon or a powdered bronze, a relatively low hydrophilic filler such as a carbon fiber, molybdenum disulfide powder or graphite powder, and the like. The average particle size of the filler used is from 10 to 1,000 μm. The filler is employed preferably in an amount of 5 to 40% by volume based on the volume of the PTFE particles. A hydrophobic filler such as carbon black may be present in a liquid medium. The presence of such a hydrophobic filler in the agitation system does not hinder the process of the present invention.

Representative examples of the aminosilane compounds used in the present invention for treating the filler are, for instance, γ-aminopropyltriethoxysilane of the formula:

$$H_2N(CH_2)_3Si(OC_2H_5)_3$$

m-aminophenyl- or p-aminophenyl-triethoxysilane of the formula:

$$H_2N-C_6H_4-Si(OC_2H_5)_3$$

γ-ureidopropyltriethoxysilane of the formula:

$$H_2NCONH(CH_2)_3Si(OC_2H_5)_3$$

N-(β-aminoethyl)-γ-aminopropyltrimethoxysilane of the formula:

$$H_2N(CH_2)_2NH(CH_2)_3Si(OCH_3)_3$$

N-(β-aminoethyl)-γ-aminopropylmethyldimethoxysilane of the formula:

$$H_2N(CH_2)_2NH(CH_2)_3Si(OCH_3)_2\overset{\underset{\displaystyle |}{CH_3}}{}$$

and the like. A very slight amount of aminosilane is sufficient for treating the surface of a filler. For instance, the surface-treatment of a hydrophilic filler with an aminosilane is carried out by immersing the filler in an aqueous solution of the aminosilane, taking out and drying the filler with simultaneous heat treatment at a temperature of not less than 100° C., preferably about 125° to about 180° C. The concentration of the aqueous solution of aminosilane is usually from about 0.001 to about 0.5% by weight, and the aqueous solution in the minimum amount necessary for wetting the filler is sufficient. Preferably, after wetting the filler with the treating solution, the wetted filler is centrifugally dehydrated.

The higher fatty acids used in the present invention are those having 12 to 18 carbon atoms such as myristic acid, lauric acid, oleic acid, stearic acid, and the like. The anionic surface active agents used in the present invention may be any of the known surface active agents such as higher fatty acid salts, alkyl sulfates, alkyl sulfonates, alkylaryl sulfonates and alkyl phosphates. Particularly preferable anionic surface active agents are salts of sulfuric acid esters of higher alcohols such as sodium lauryl sulfate, and fluorine-containing carboxylic or sulfonic acid compounds having a fluoroalkyl group or a fluorochloroalkyl group, representative examples of which are compounds of the general formula:

$$X(CF_2CF_2)_n(CH_2)_mA$$

or $$X(CF_2CFCl)_n(CH_2)_mA$$

wherein X is hydrogen atom, fluorine atom or chlorine atom, n is an integer of 3 to 10, m is 0 or an integer of 1 to 4, and A is carboxyl group, sulfo group, an alkali metal salt thereof or an ammonium salt thereof. The higher fatty acid and/or the surface active agent is used within the range of 0.1 to 5% by weight based on the weight of PTFE, and the higher fatty acid and/or the surface active agent is preferably used in an increased or decreased amount in proportion to the amounts of the PTFE and filler used.

It is necessary that the water-immiscible organic liquids used in the present invention have a surface tension of not more than 40 dynes/cm. at 20° C. and a boiling point of not less than 40° C. Examples of the water-immiscible organic liquid are, for instance, aliphatic hydrocarbons such as pentane and dodecane; alicyclic hydrocarbons such as cyclohexane and methyl cyclohexane; aromatic hydrocarbons such as benzene, toluene and xylene; halogenated hydrocarbons such as tetrachloroethylene, trichloroethylene, chloroform and chlorobenzene; and the like. Fluorinated and chlorinated hydrocarbons which are liquids at ordinary temperature, e.g. tetrachlorodifluoroethane, trichlorotrifluoroethane and trichlorofluoromethane, are preferable, and among them, tetrachlorodifluoroethane is particularly preferable in that a liquid medium for agglomeration can be heated to a high temperature near 100° C. The organic liquid is usually employed in an amount of 10 to 150 ml., preferably 25 to 75 ml., per 100 g. of the total of the PTFE and filler.

It is necessary that water is present in the system in an amount sufficient to agitate the PTFE particles and the filler substantially in the form of slurry. In general, water is employed in an amount of 1 to 500 times the total weight of the PTFE particles and the filler.

To practice the process of the present invention, the surface-treated filler is first agitated in water in the presence of the higher fatty acid or the anionic surface active agent. The order of the addition of these substances to an agitation vessel is not important, but during addition, agitation should be continued. That is to say, after adding water to an agitation vessel, the surface active agent and the filler are added to the vessel with agitation. Since the filler is made hydrophobic by the higher fatty acid or the surface active agent, thus becoming hard to be wetted with water, the filler floats on water or deposits to the bottom of the vessel. Thus, it is necessary that the filler becomes hydrophobic. When the filler is not made hydrophobic at this stage, uniform blend of the PTFE particles and the filler cannot be attained, even if the PTFE particles and the water-immiscible organic liquid are added with or without other additives in any manners in the next stage. Therefore, it is important to confirm the condition of the filler at this stage. Agitation of the filler is carried out for a time sufficient to become hydrophobic, usually for 1 to 30 minutes.

The finely-divided PTFE particles and the water-immiscible organic liquid are then added to the agitation vessel in that order while agitating. Preferably, the PTFE particles are added to a vessel under rather vigorous agitation of such a high power as accompanying a shearing force on the PTFE particles. At this stage, uniform mixing of the filler and the PTFE particles is completed. Thereafter the water-immiscible organic liquid is added, but after the addition of the organic liquid the mixture is preferably agitated under a relatively mild agitation condition to achieve agglomeration. In general, the higher the rate of agitation after the addition of the organic liquid, the smaller the average particle size of the agglomerated product, and inversely, the lower the rate of agitation, the larger the average particle size of the agglomerated product. The agitation is carried out for a time sufficient to agglomerate the finely-divided PTFE particles.

The temperature upon agitation is not critical, but agitation is preferably at ordinary temperature or higher. Also, agitation with raising the temperature is effective in making the inner structure of the agglomerated particles dense, and moreover the apparent density and flowability of the obtained powder can be raised. It is also possible to gradually raise the temperature so as to evaporate and recover the organic liquid dispersed in water. In this manner, it is possible to finish the recovery of almost all of the used organic liquid during agitation.

After the completion of the agglomeration, the agglomerated granular PTFE powder is recovered and dried in a usual manner.

In the specification, the physical properties as shown herein are determined in the following manners.

(1) Average Particle Size

Standard sieves of 10, 20, 32, 48 and 60 meshes are assembled in order with the 10 mesh sieve on top, and a powder is charged to the top sieve. The assembled sieves are shaken, and after shaking, the weight of the powder retained on each sieve is determined. On the basis of the weights, the cumulative weight percentages are calculated and plotted on the axis of ordinate of a logarithm probability paper against the sieve-opening size on the axis of abscissa. The average particle size is read from the plotted line as the size on the abscissa at the 50% on the ordinate.

(2) Tensile Strength and Elongation

A sheet having a thickness of 1.5 mm. is prepared by compressing a powder under a pressure of 500 kg./cm.$^2$, sintering at 380° C. for 3 hours, and leaving it in a room to cool. Dumbbell test pieces (No. 3) are punched from the sheet, and the tensile strength and elongation at breaking are measured according to Japanese Industrial Standard (JIS) K 6301.

(3) Specific Gravity

A molding having a diameter of 50 mm. and a height of 50 mm. is prepared by compressing a powder under a pressure of 500 kg./cm.$^2$, sintering at 370° C. for 5.5 hours and cooling at a rate of 50° C./hour to room temperature. A test sample having a diameter of 30 mm. and a height of 5 mm. is cut out from the molding, and the specific gravity of the sample is determined by replacement method in n-butanol.

(4) Shrinkage Percentage

A molding having a height of 50 mm. is prepared by compressing a powder in a mold having an inner diameter of 50 mm. under a pressure of 500 kg./cm.$^2$, sintered at 370° C. for 5.5 hours and then cooled to a room temperature at a rate of 50° C./hour. The diameter of the sintered molding is measured, and the shrinkage percentage is calculated according to the formula, (50-diameter of the molding at sintering)×100/50.

(5) Powder Flowability

The flowability of a powder is determined by employing a measuring device shown in FIG. 1. An upper hopper 1 and an under hopper 2 which are made of stainless steel are fixed to a supporter 12 to accord their center-lines. The upper hopper 1 has an entrance 3 of 74 mm. in diameter and an exit 4 of 12 mm. in diameter, and a height from the entrance 3 to the exit 4 is 123 mm. A bottom plate 5 is provided at the exit 4 to make the powder retain or fall. The upper hopper 2 has an entrance 6 of 76 mm. in diameter and an exit 7 of 12 mm. in diameter, and a height from the entrance 6 to the exit 7 is 120 mm. Also at the exit 7, a bottom plate 8 is provided. A distance between both hoppers is adjusted to keep a distance between both bottom plates into 15 cm. Further, the exits 4 and 7 are covered with covers 9 and 10, respectively. Numeral 11 is an accepting vessel for the powder.

After allowing 200 g. of the powder to stand for at least 4 hours in a room adjusted at a temperature of 23.5° to 24.5° C. and then sieving the powder with 10 mesh sieve (sieve opening: 1,680 μm.), the measurement of the powder flowability is carried out at the same temperature as follows:

(I) At first, the powder full-filled in a 30 ml. cup is placed in the upper hopper 1, and immediately the bottom plate 5 is pulled out to make the powder fall. When the powder does not fall, it is made to fall by poking with a wire. After the powder completely falls into the upper hopper 2, it is allowed to stand for 15±2 seconds, the bottom plate 8 is pulled out and it is observed whether or not the powder flows out of the exit 7. In case the powder flows down within 8 seconds completely, the powder is judged as to have fallen.

(II) The same measurement is repeated 3 times to observe whether the powder falls or not. In case the powder flows down at least twice in three measurements, the flowability is judged as "good". In case the powder never falls in three measurements, the flowability is judged as "bad". In this repetition, when the powder flows down once in three measurements, the same measurement is further repeated 2 times. In case the powder flows down every 2 times, the flowability is eventually judged as "good", and when the powder does not flow down at least one time, the flowability is eventually judged as "bad".

(III) The powder judged as "good" in accordance with the above measurement is subsequently subjected to the same measurement as in the above item (II) except that two cups of powder are employed, in order to determine the "powder flowability". In case the flowability is judged as "good", the measurement is further carried out with 3 cups of the same powder, and thereafter the amount of powder is increased one by one in number of cups at most to 8 cups till the flowability of the powder becomes "bad". In each measurement, the powder flowed down out of the under hopper may be employed again for the measurement.

(IV) In the above measurement, the larger the amount of the powder, that is, the more the cup's number, the less the powder falls down. In view of this point, the value obtained by subtracting 1 from the cup's number when the flowability becomes "bad" is defined as "powder flowability".

(6) Surface smoothness

The surface smoothness of a sheet prepared in the same manner as in the above item (2) is measured by employing a smoothness tester SE-4 made by Kabushiki Kaisha Kosaka Kenkyusho. The surface smoothness is represented by center line average roughness (Ha: μm.)

The present invention is more specifically described and explained by means of the following Examples.

EXAMPLES 1 to 9

A stainless steel cylindrical tank of 180 mm. in inner diameter and 200 mm. in height, equipped with an agitator and provided with two baffles on the inner wall and an external jacket for controlling the temperature, was employed as an agitation apparatus. The agitator was hung down at the center of the tank, and had a vane at the lower end. As a vane, there were employed two types of vanes (A) and (B) shown in FIGS. 2A and 2B, the vane (A) being of the type in which 4 nearly circular blades of 56 mm. in outer diameter of rotation are arranged like a screw, and the vane (B) being of the type in which a U-shaped plate of 20 mm. in width is fixed to the axis and the outer diameter and height are 80 mm. and 50 mm., respectively.

The tank was charged with 2 liters of water, and after maintaining the temperature at about 40° C., a fibrous glass powder (commercially available under the commercial name "PFA-001" made by Nitto Boseki Co., Ltd., average diameter: 12 μm., average length: 80 μm.) treated with an aminosilane shown in Table 1 was added in an amount shown in Table 1 to the tank. The mixture was agitated for 5 minutes at 3,000 r.p.m. by the agitator equipped with the vane (A), and an anionic surface active agent, i.e. ammonium perfluorooctanoate, of the amount shown in Table 1 was added to the tank. After agitating for 5 minutes at 3,000 r.p.m., 375 g. of a finely-divided PTFE powder having an average particle size of 35 μm. was added and the agitation was continued for 5 minutes. Tetrachlorodifuloroethane was then added as a water-immiscible organic liquid in an amount shown in Table 1, and after agitating for 5 minutes at 3,000 r.p.m., the vane (A) was exchanged with the vane (B) and the mixture was agitated for 40 minutes at 300 r.p.m. In the above procedure, the temperature of the mixture was gradually raised from the start of agitation to the exchange of the vane, and thereafter the temperature was raised at a higher rate eventually to 70° to 73° C.

After the completion of the agitation, the mixture was filtered through a 60 mesh wire screen, and the filtered solid was dried in a drier at 135° C. for 16 hours to give an agglomerated product.

On the other hand, the filtrate was filtered through a filter paper, and the filtered material was dried together with the filter paper to determine the weight of the fibrous glass powder filled liberated into the liquid medium used for agglomeration. The degree of the filler separation (%) was calculated according to the formula, (weight of liberated filler)×100/weight of filler used.

The above-mentioned surface treatment of the fibrous glass powder filler with an aminosilane was conducted by immersing the filler in a 0.01% by weight of aminosilane, sufficiently agitating the mixture, allowing to stand to precipitate the filler, filtering and drying the filler in a drier at 160° C.

The results are shown in Table 1.

EXAMPLE 10

The procedure of Example 1 was repeated except that ammonium ω-hydroperfluorocarboxylate was employed as an anionic surface active agent instead of ammonium perfluorooctanoate.

The filler separation percentage was less than 0.5% by weight, and also the free filler was not present in the dried granules in such an amount as exerting an influence on molding.

The results are shown in Table 1.

EXAMPLE 11

The procedure of Example 1 was repeated except that glass beads having an average particle size of 20 μm. were employed as a filler instead of the fibrous glass powder.

The filler separation percentage was 1.5% by weight, and also the free filler was not present in the dried granules in such an amount as exerting an influence on molding.

The results are shown in Table 1.

COMPARATIVE EXAMPLES 1 to 7

The procedures of Example 1 were repeated except that the anionic surface active agent was not employed (Com. Ex. 1), a fibrous glass powder treated with other treating agents than the aminosilane was employed (Com. Exs. 2 to 6), and a fibrous glass powder treated with a treating agent other than the aminosilane and a cationic surface active agent, i.e. alkyl amine salt (commercially available under the commercial name "AR-MAC" made by The Lion Fat & Oil Co., Ltd.) were employed (Com. Ex. 7).

The results are shown in Table 2.

TABLE 1

|  | Treating agent of filler | Amount of filler (g.) | Amount of surface active agent (g.) | Amount of organic liquid (ml.) | Average particle size of granules (μm.) | Filler separation (%) |
| --- | --- | --- | --- | --- | --- | --- |
| Ex. 1 | γ-aminopropyltriethoxysilane | 66 | 1.5 | 200 | 740 | 0 |
| Ex. 2 | γ-aminopropyltriethoxysilane | 125 | 1.5 | 250 | 640 | <0.5 |
| Ex. 3 | γ-aminopropyltriethoxysilane | 160 | 1.5 | 250 | 680 | <0.5 |
| Ex. 4 | γ-aminopropyltriethoxysilane | 200 | 1.5 | 250 | 690 | <1 |
| Ex. 5 | γ-aminopropyltriethoxysilane | 250 | 1.5 | 250 | 750 | 1.5 |
| Ex. 6 | γ-aminopropyltriethoxysilane | 125 | 2.0 | 50 | 700 | <0.5 |
| Ex. 7 | γ-aminopropyltriethoxysilane | 250 | 3.0 | 250 | 770 | <0.5 |
| Ex. 8 | N—(β-aminoethyl)-γ-aminoethyl)-γ-aminopropyltrimethoxysilane | 66 | 1.5 | 200 | 610 | 0 |
| Ex. 9 | N—(β-aminoethyl)-γ-aminoethyl)-γ-aminopropylmethyldimethoxysilane | 66 | 1.5 | 200 | 620 | 0 |
| Ex. 10 | γ-aminopropyltriethoxysilane | 66 | 1.5 | 200 | 680 | <0.5 |
| Ex. 11 | γ-aminopropyltriethoxysilane | 66 | 1.5 | 200 | 650 | 1.5 |

TABLE 2

|  | Treating agent of filler | Amount of filler (g.) | Amount of surface active agent (g.) | Amount of organic liquid (ml.) | Average particle size of granules (μm.) | Filler separation (%) |
| --- | --- | --- | --- | --- | --- | --- |
| Com. Ex. 1 | γ-aminopropyltriethoxysilane | 66 | 0 | 200 | 680 | 12 |
| Com. Ex. 2 | γ-methacryloyloxypropyltrimethoxysilane | 66 | 1.5 | 200 | — | 11 |
| Com. Ex. 3 | trimethoxymethylsilane | 66 | 1.5 | 200 | — | 7 |
| Com. Ex. 4 | dihydroxy-bis-(lactic acid)-titanate | 66 | 1.5 | 200 | — | 10 |
| Com. Ex. 5 | borane | 66 | 1.5 | 200 | — | 9 |
| Com. Ex. 6 | γ-mercaptopropyltriethoxysilane | 66 | 1.5 | 200 | — | 3.5 |
| Com. Ex. 7 | γ-mercaptopropyltriethoxysilane | 66 | 1.5 | 200 | — | 21 |

In Comparative Example 6, the degree of filler separation was comparatively low, but the agglomerated product contained a large amount of free fibrous glass powder.

From the results shown in Tables 1 and 2, it is seen that according to the process of the present invention, the degree of filler separation is very low as compared with Comparative Examples. The filled PTFE powder obtained in Examples are agglomerated granules in which the fibrous glass powder is uniformly incorporated and which can provide dense moldings. In contrast, the agglomerated products obtained in Comparative Examples contain generally a large amount of a free fibrous glass powder, and it would be understood that due to free fibrous glass powder, the agglomerated products require an abnormally high pressure in molding and cannot provide dense moldings.

EXAMPLES 12 to 16 and COMPARATIVE EXAMPLES 8 and 9

The procedures of Example 1 were repeated except that the kinds of the filler treating agent, anionic surface active agent and organic liquid and the agitation temperature condition were changed as shown in Tables 3A and 3B.

The results are shown in Tables 3A and 3B.

TABLE 3A

|  | Treating agent of filler | Anionic surface active agent | | Organic liquid | |
|---|---|---|---|---|---|
|  |  | Kind | Amount (g.) | Kind | Amount (ml.) |
| Ex. 12 | γ-aminopropyltri-ethoxysilane | lauric acid | 1.5 | trichlorotrifluoroethane | 200 |
| Com. Ex. 8 | — | " | 1.5 | " | 200 |
| Com. Ex. 9 | — | — | — | perchloroethylene γ-aminopropyltriethoxysilane | 100 0.5 |
| Ex. 13 | γ-aminopropyltri-ethoxysilane | myristic acid | 1.5 | tetrachlorodifluoroethane | 200 |
| Ex. 14 | γ-aminopropyltri-ethoxysilane | sodium oleate | 1.5 | " | 200 |
| Ex. 15 | γ-aminopropyltri-ethoxysilane | sodium laurylbenzene-sulfonate | 1.5 | " | 200 |
| Ex. 16 | γ-aminopropyltri-ethoxysilane | sodium laurylsulfate | 1.5 | " | 200 |

TABLE 3B

|  | Temperature (°C.) | | | Average particle size of granules (μm.) | Filler separation (%) |
|---|---|---|---|---|---|
|  | At the start of agitation | At the time of exchanging vane | At the end of agitation | | |
| Ex. 12 | 70 | 70 | 73 | 560 | 2.0 |
| Com. Ex. 8 | 70 | 71 | 77 | — | 19 |
| Com. Ex. 9 | 42 | 50 | 73 | — | 25 |
| Ex. 13 | 60 | 65 | 72 | 650 | 1.5 |
| Ex. 14 | 60 | 70 | 72 | 610 | 1.0 |
| Ex. 15 | 70 | 70 | 72 | 600 | 2.5 |
| Ex. 16 | 45 | 50 | 70 | 650 | 1.0 |

EXAMPLES 17 and 18 and COMPARATIVE EXAMPLES 10 and 11

By employing 120 g. of bronze powder treated with γ-aminopropyltriethoxysilane as a filler and 80 g. of the same finely-divided PTFE particles as in Example 1, the agglomeration of the particles was carried out under the conditions shown in Tables 4A and 4B in the same manner as in Example 1.

The results are shown in Tables 4A and 4B.

TABLE 4A

|  | Amount of water (l.) | Anionic surface active agent | | Organic liquid | |
|---|---|---|---|---|---|
|  |  | Kind | Amount (g.) | Kind | Amount (ml.) |
| Ex. 17 | 2 | ammonium perfluorooctanoate | 1.5 | perchloroethylene | 200 |
| Ex. 18 | 2 | sodium laurate | 1.5 | " | 200 |
| Com. Ex. 10 | 1.5 | " | 0.01 | " | 100 |
| Com. Ex. 11 | 1.5 | " | 0.01 | " | 100 |

TABLE 4B

|  | Temperature (°C.) | | | Average particle size of granules (μm.) | Filler separation (%) |
|---|---|---|---|---|---|
|  | At the start of agitation | At the time of exchanging vane | At the end of agitation | | |
| Ex. 17 | 45 | 52 | 67 | 990 | 2.0 |
| Ex. 18 | 70 | 72 | 78 | 950 | 2.5 |
| Com. Ex. 10 | 70 | 73 | 77 | — | 31 |
| Com. Ex. 11 | 70 | 73 | 78 | — | 38 |

With respect to the agglomerated PTFE powder obtained in Examples 1, 8 to 11 and 16, physical properties of the powder and the moldings prepared therefrom were measured.

The results are shown in Table 5.

TABLE 5

| | Example No. | | | | | |
|---|---|---|---|---|---|---|
| | 1 | 8 | 9 | 10 | 11 | 16 |
| Apparent density (g./cm.$^3$) | 0.62 | 0.66 | 0.66 | 0.69 | 0.70 | 0.58 |
| Specific gravity | 2.210 | 2.196 | 2.191 | 2.208 | 2.199 | 2.224 |
| Flowability | 4< | 8< | 5.5 | 8< | 8< | 4.5 |
| Shrinkage percentage | 2.14 | 1.96 | 1.98 | 2.00 | 2.14 | 2.34 |
| Tensile strength (kg./cm.$^2$) | 198 | 183 | 177 | 205 | 199 | 224 |
| Elongation (%) | 262 | 268 | 268 | 340 | 272 | 328 |
| Surface smoothness | 1.0–1.5 | 1.0–1.5 | 1.0–1.5 | 1.0–1.5 | 1.0–1.5 | 1.0–1.5 |

What we claim is:

1. In a process for preparing a filled polytetrafluoroethylene molding powder by agitating finely-divided polytetrafluoroethylene particles having an average particle size of not more than 100 μm. and a particulate hydrophilic filler in water in the presence of a water-immiscible organic liquid, the improvement which comprises, agitating a mixture of water and a particulate hydrophilic filler which has been surface-treated with an aminosilane compound, said agitating being conducted in the presence of at least one member selected from the group consisting of a higher fatty acid having 12 to 18 carbon atoms and an anionic surface active agent; adding to the agitating mixture the finely-divided polytetrafluoroethylene particles and the water-immiscible organic liquid in that order; and agitating the resulting mixture for a time sufficient to agglomerate the particles.

2. The process of claim 1, wherein an aqueous dispersion of colloidal polytetrafluoroethylene particles having an average particle size of 0.1 to 0.5 μm. is added to the agitation system before adding the water-immiscible organic liquid.

3. The process of claim 1, wherein said particulate hydrophilic filler is at least a member selected from the group consisting of a fibrous glass powder and a bronze powder.

4. The process of claim 1, wherein said particulate hydrophilic filler is at least a member selected from the group consisting of a molybdenum disulfide powder and a graphite powder.

5. The process of claim 1, wherein said anionic surface active agent is a member selected from the group consisting of carboxylic acid compounds having a fluoroalkyl group or a fluorochloroalkyl group, sulfonic acid compounds having a fluoroalkyl group or a fluorochloroalkyl group, and salts of sulfuric acid esters of higher alcohols.

* * * * *